United States Patent [19]

Clem

[11] 4,070,839
[45] Jan. 31, 1978

[54] MOISTURE IMPERVIOUS PANEL
[75] Inventor: Arthur G. Clem, Des Plaines, Ill.
[73] Assignee: American Colloid Company, Skokie, Ill.
[21] Appl. No.: 722,004
[22] Filed: Sept. 9, 1976
[51] Int. Cl.$^2$ .............................................. E04B 5/52
[52] U.S. Cl. ...................................... 52/448; 52/451; 52/618
[58] Field of Search ................ 52/618, 450, 451, 447, 52/448, 169.13; 428/117

[56] References Cited
U.S. PATENT DOCUMENTS

| | | | |
|---|---|---|---|
| 2,576,530 | 11/1951 | Medal | 52/618 X |
| 3,186,896 | 6/1965 | Clem | 52/618 X |
| 3,466,827 | 9/1969 | Clem | 52/446 |

*Primary Examiner*—Price C. Faw, Jr.
*Assistant Examiner*—Carl D. Friedman
*Attorney, Agent, or Firm*—Mason, Kolehmainen, Rathburn & Wyss

[57] ABSTRACT

A moisture impervious panel includes a pair of spaced facing sheets interconnected by a central rigid support sheet, such as corrugated fiberglass, to form a plurality of pockets between the support sheet and the facing sheets. The pockets are filled with a composition of water-swellable bentonite and a compressible filler, such as vermiculite.

8 Claims, 2 Drawing Figures

MOISTURE IMPERVIOUS PANEL

BACKGROUND OF THE INVENTION

A. Field of the Invention

The present invention relates to a moisture impervious panel, and more particularly, to a moisture impervious panel particularly suitable as a water barrier for a roofing surface, having a central, rigid support structure filled above and below with a mixture of water-swellable bentonite clay and a compressible filler.

One problem in the existing roof structures wherein roofing sheets form an outer barrier is that water often penetrates the outside barrier and migrates along the junction between the roof and the undersurface of the outer barrier until it finds a spot at which it can penetrate the roof and enter the building. It is not unusual to have a leak in the outer barrier and a leak in the building located from 30 to 100 feet apart. In many roofs, the outer roof barrier is a concrete wear surface, such as that in a parking garage. When the expansion joints of such a concrete wear surface open as a result of a drop in temperature, water can easily pass through the wear surface and leak through the roof into the parking garage. The water-impervious panel of the present invention is sandwiched between the roof and the outer roof wear surface to prevent water which has penetrated the outer wear surface from also penetrating the roof.

B. Prior Art

To prevent water which has penetrated an outer wear surface from reaching a roof, sheets of tar paper or other water impervious, flexible sheets have been used to cover the roof and the flexible sheets are covered with a wear surface. The wear surface, such as one inch pad of concrete, is poured over the flexible sheets, thereby holding the sheets in place. It has been found that the constant expansion and shrinkage of the outer wear surface caused by changes in temperatures tears the water impervious flexible sheets thereunder thereby rendering the sheets ineffective.

As one solution to this problem, the water impervious roofing panel disclosed in my prior U.S. Pat. No. 3,466,287 includes a rigid, non-biodegradable upper surface so that expansion and contraction of the upper wear surface cannot tear the water-imperious panel. My prior U.S. Pat. No. 3,466,287 discloses the use of a mixture of finely divided bentonite clay and a compressible filler to form a waterproof barrier for roof constructions. The bentonite is combined with sufficient compressible filler such that the bentonite can expand, when wetted, without buckling the roof. The composition is applied wet to the undersurface of a rigid, durable sheet having embossed dimples to adhere the composition to the undersurface of the dimples. On top of the rigid sheet, a suitable wear surface such as concrete, or a plurality of plys of roofing paper, is applied as an outer barrier. The rigid outer surface of the moisture impervious panel was thought essential because of expansion and contraction of the wear surface and continued traffic on said wear surface which would cause the bentonite composition of a flexible sheet to extrude and render the panel ineffective.

SUMMARY OF THE INVENTION

Surprisingly, it has been found that a roofing panel having a central rigid, non-biodegradable support structure filled above and below the central rigid support member with a dry or slightly moist mixture of water-swellable bentonite clay and a compressible filler, will prevent water penetration when disposed under a wear surface. The top surface of the panel is paper or other biodegradable material thereby providing excellent access to the bentonite composition for water leaking through the wear surface. The central, rigid support member surprisingly provides sufficient structural integrity to the water impervious panel to maintain a predetermined depth of bentonite composition between a roof, below the panel, and a wear surface, above the panel, and prevents damage to the panel which would cause leakage because of expansion and contraction of the wear surface. Further, because the water impervious panel is completely contained by spaced sheets forming an upper and lower surface, the entire panel can be filled with dry bentonite-filler composition thereby eliminating the need to wet the composition as previously necessary to adhere the composition to a rigid support surface. The ability to fill the panel with a dry composition also eliminates the need to thereafter dry the composition in place.

Accordingly, it is an object of the present invention to provide a new and improved moisture impervious panel which overcomes the above mentioned difficulties.

A further object of the present invention is to provide a new and improved moisture impervious panel for use in deck construction and roofing applications.

A further object of the present invention is to provide a moisture impervious panel having sufficient rigidity to maintain a predetermined depth of a bentonite composition under a wear surface while having a large percentage of top surface area accessible to penetration of water.

A further object of the present invention is to provide a new and improved water impervious panel useful as a water barrier under a wear surface, the panel not being subject to destruction or substantial deterioration as a result of expansion and contraction of the wear surface.

These and other objects and advantages of the present invention will become apparent from the following detailed description of the present invention in which.

DETAILED DESCRIPTION OF THE PREFERRED EMBODIMENT

Figure 1:
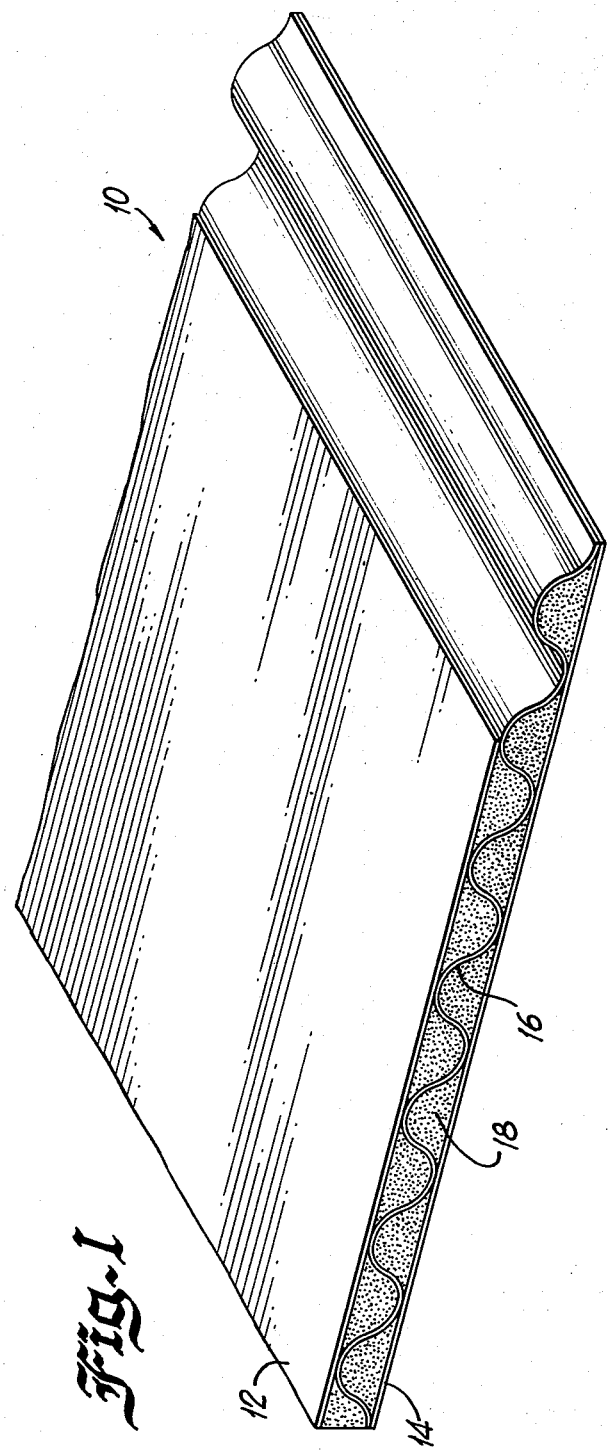
FIG. 1 is a partially broken-away perspective view of the moisture impervious panel manufactured in accordance with the principles of the present invention.

Turning now to the drawing, and initially to FIG. 1, like reference numerals are used to designate corresponding parts in both views. The moisture impervious panel of the present invention, indicated generally by reference numeral 10, includes spaced top and bottom facing sheets, 12 and 14 respectively, a non-biodegradable central support sheet 16, and a bentonite clay-comprressible filler composition 18 filling voids formed between the central support sheet 16 and the facing sheets 12 and 14.

The bentonite clay composition includes water-swellable bentonite, and a suitable compressible filler, such as vermiculite. Other compressible fillers which may be used are asbestos, glass fiber, and the like. A composition of 40-60% bentonite and 40-60% compressible filler, by weight of the dry composition, provides enough bentonite for swelling on contact with water to prevent water penetration, and provides enough compressible filler to absorb the swell within the original panel volume so that substantially no change in thickness of the panel occurs when wetted. The bentonite is combined with sufficient compressible filler such that the bentonite can expand, when wetted, within the confines of the upper and lower opposing sheets 12 and 14 to prevent roof buckling, wear surface destruction and the like which would otherwise result from swelling of the bentonite.

A dry bentonite-compressible filler composition can be added to the corrugated fiberglass sheet 16 or other corrugated non-biodegradable material, before or after securing the top and bottom opposing sheets 12 and 14 to the corrugated central support member 16. It is preferred to add the bentonite-compressible filler composition to the non-biodegradable corrugated strip 16 prior to securing the opposing facing sheets 12 and 14 to the uppermost and lowermost portions of the corrugated strip.

A corrugated fiberglass sheet 16 can be continuously filled with the bentonite-filler composition 18 on both surfaces to fill all voids by conveying the sheet 16 under a hopper filled with the above described bentonite-compressible filler composition 18 to fill the corrugations or grooves on one surface of the sheet 16. One facing sheet 12 or 14 is then glued or otherwise suitably secured to the sheet 16, on the filled side, to confine the composition 18 within the corrugations. The half-filled panel is then turned over to fill the corrugations or grooves on the other surface of corrugated sheet 16 in the same manner. The remaining facing sheet 12 or 14 is secured over the composition 18 to the corrugated sheet 16.

Figure 2:
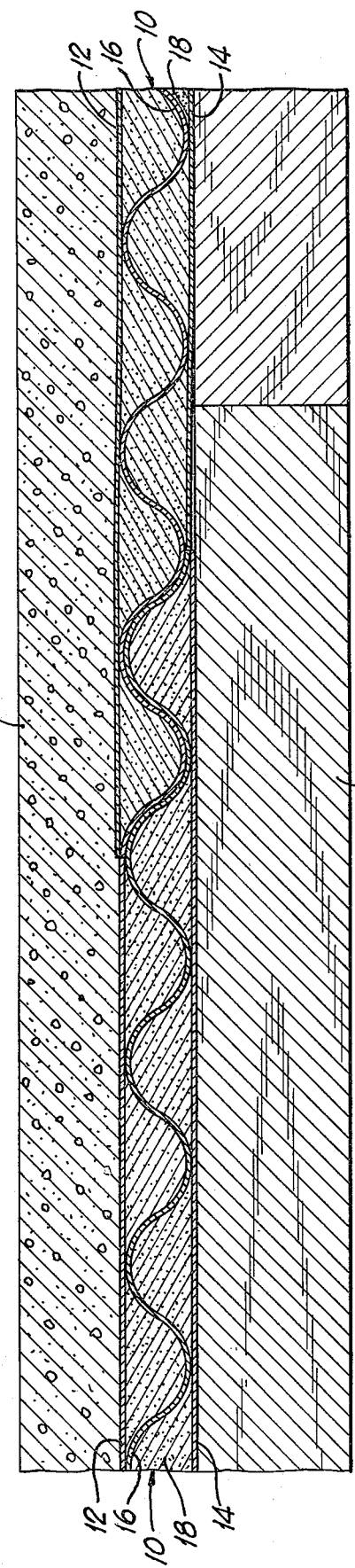
FIG. 2 is a partially broken-away front view showing moisture impervious panels of the present invention, in position, sandwiched between a roof and a wear surface.

As shown in FIG. 2, a plurality of moisture impervious panels 10 are disposed in contact with one another, on top of a roof 20 or other structure to be protected from water. Concrete 30 or another suitable wear surface is disposed directly on top of the moisture impervious panels 10. The panels can be nailed to the roof 20 or otherwise suitably secured to the roof 20. but concrete 30 and other heavy wear surfaces will hold the panels 10 in position without additional fastening means.

It is to be understood that the term "corrugated" used to describe sheet 16 is used in its broadest sense to include a wrinkled or folded sheet or any other configuration providing ridges such that when flat facing sheets 12 and 14 are secured above and below these ridges, as shown in the drawing, the corrugated sheet forms a plurality of pockets for the bentonite-filler composition.

Although the physical strength of the resulting panel 10 may be increased by packing the bentonite in place, to provide a structure capable of transportation without spilling the bentonite composition 18 from the ends of the filled voids, the edges of the panel 10 may be sealed with wax, tape or other suitable means.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A deck structure comprising first and second adjacent panels each panel comprising a pair of spaced facing sheets interconnected by a central rigid, non-biodegradable, corrugated support sheet forming a plurality of voids between the central rigid sheet and respective ones of the facing sheets, and a mixture of water-swellable bentonite and a compressible filler substantially filling said voids; and a wear surface covering the top faces of said first and second panels, said top faces being water penetrable; said central, rigid, non-biodegradable, corrugated support sheets of said first and second panels overlapping in mating contact.

2. A deck structure as defined in claim 1 wherein said wear surface is concrete.

3. A deck structure as defined in claim 1 wherein said corrugated sheets contact said spacing sheets.

4. A deck structure as defined in claim 3 wherein said corrugated sheets comprise fiberglass.

5. A method of rendering a surface water impermeable comprising, disposing on said surface a plurality of moisture impervious panels, interconnected by a central, rigid, non-biodegradable, corrugated support sheet, each panel comprising a top sheet of a water penetrable material spaced apart from a bottom sheet, said top sheet interconnected to said bottom sheet by said central, rigid, non-biodegradable, corrugated support sheet, said support sheet forming a plurality of voids between the support sheet and both the top sheet and the bottom sheet, and a mixture of water-swellable bentonite and a compressible filler substantially filling said voids; and disposing a wear surface on the top sheet of said panels.

6. A method as defined in claim 5 wherein said wear surface comprises concrete.

7. A method as defined in claim 5 wherein said corrugated sheet of each panel comprises fiberglass.

8. A method of forming a water-impermeable deck structure comprising filling voids in first and second panels with a mixture of water-swellable bentonite and a compressible filler, each panel comprising a pair of spaced facing sheets, including an uppermost water penetrable facing sheet, interconnected by a central, rigid, non-biodegradable, corrugated support sheet at least one of said facing sheets of each panel disposed to incompletely cover said corrugated central support sheets; interconnecting said panels by disposing an uncovered portion of the corrugated sheet of said first panel over an uncovered corrugated portion of said second panel such that the central, rigid, non-biodegradable corrugated sheets of said first and second panels are in direct contact along said uncovered portions to provide a mixture of water-swellable bentonite and a compressible filler above and below the contacting portions of said support sheets and disposing a wear surface on the top sheet of said panels.

* * * * *